United States Patent [19]
Nienhaus

[11] Patent Number: 5,980,389
[45] Date of Patent: Nov. 9, 1999

[54] DRIVESHAFT WITH COUPLING MEANS

[75] Inventor: Clemens Nienhaus, Neunkirchen-Seelscheid, Germany

[73] Assignee: GKN Walterscheid GmbH, Lohmar, Germany

[21] Appl. No.: 08/942,910

[22] Filed: Oct. 2, 1997

[30] Foreign Application Priority Data

Oct. 4, 1996 [DE] Germany .............................. 196 40 888

[51] Int. Cl.⁶ ........................................................ F16D 3/84
[52] U.S. Cl. ............................................ 464/172; 464/182
[58] Field of Search .................................... 464/170, 172, 464/177, 162, 113, 182, 147; 74/608, 609

[56] References Cited

U.S. PATENT DOCUMENTS

| | | | |
|---|---|---|---|
| 2,793,512 | 5/1957 | Larsen | 464/172 |
| 2,796,749 | 6/1957 | Warner | 464/172 |
| 4,215,869 | 8/1980 | Pendleton | 464/170 |
| 5,013,282 | 5/1991 | Keller | 464/172 |
| 5,509,858 | 4/1996 | Grosse-Entrup | 464/172 |
| 5,665,001 | 9/1997 | Jacob et al. | 464/182 |
| 5,669,455 | 9/1997 | Dietrich | 464/182 |
| 5,702,306 | 12/1997 | Adamek et al. | 464/172 |
| 5,730,657 | 3/1998 | Olgren | 464/170 |

FOREIGN PATENT DOCUMENTS

| | | |
|---|---|---|
| 1406145 | 12/1965 | France . |
| 31 49 019 A1 | 6/1983 | Germany . |
| 33 02 976 C1 | 10/1997 | Germany . |

*Primary Examiner*—Eileen Dunn Lillis
*Attorney, Agent, or Firm*—Harness, Dickey & Pierce, P.L.C.

[57] ABSTRACT

A driveshaft has two shaft parts (4, 6) which provide a coupling. To facilitate the operation of coupling the two shaft parts (4, 6) to one another, the coupling operation is divided into two phases. A member initially aligns the two shaft parts (4, 6) along a common longitudinal axis (13). Also, the shafts are rotationally fast connected between the shaft parts. A centering journal (20) centers the two shaft parts (4, 6) relative to one another on a common longitudinal axis (13). The centering journal centers the bore (16) of the first profiled tube (12) with a relative rotation of the two shaft parts (4, 6) continuing to be possible. When inserting the two shaft parts (4, 6) into one another, the first coupling part (19), which is firmly connected to the first profiled tube (12), via its claws approaches the claws of the second coupling part (40). The second coupling part (40) is displaceable on the second profiled tube (28) via a setting sleeve (34) against the force of a spring (38). When the first coupling part (19) abuts the second coupling part (40), the second coupling part is then displaced against the force of the spring (38). When the drive is switched on and when the two shaft parts (4, 6) reach a relative position relative to one another, the claws and gaps of the two coupling parts (19, 40) are moved into matching positions. The compression spring (38) pushes the second coupling part (40) towards the first universal joint (ε), so that the claws engage one another and transmit torque.

6 Claims, 3 Drawing Sheets

DRIVESHAFT WITH COUPLING MEANS

BACKGROUND OF THE INVENTION

The invention relates to agricultural machinery drives or driveshafts. The driveshaft is provided with a first shaft part. The first part includes a first universal joint and a first profiled tube. The driveshaft is also provided with a second shaft part. The second shaft part includes a second universal joint and a second profiled tube. The second tube's cross-section deviates from a circular cross-section. Furthermore, means for coupling the two shaft parts together is included. The means includes centering guiding means associated with the first profiled tube and a centering journal associated with the second profiled tube. The means serve to align the two shaft parts relative to one another. In the coupled condition, the two shaft parts have a common longitudinal axis.

A driveshaft with a coupling means is described in DE 33 02 976 C1. The two profiled tubes are provided in the form of double rib tubes. The two tubes are adapted to one another in respect of size in such a way that, when inserted into one another, they are able to transmit torque while at the same time permitting adjustments, such as length changes between the two universal joints. To be able to couple the two profiled tubes it is essential for the inner profiled tube to be angularly accurately aligned relative to the outer profiled tube. To facilitate the alignment in the case of a drive assembly, where the transmission of torque takes place in one direction of rotation only, either a freewheeling device provided in the tractor drive or, additionally, a freewheeling unit at one end of the driveshaft is used. However, such an embodiment is not suitable for a driveshaft which is to be used for the transmission of torque in both possible directions.

SUMMARY OF THE INVENTION

It is an object of the invention to provide a driveshaft with a coupling, which, even if the coupling is designed to transmit torque in both directions of rotation, the coupling facilitates the operation of coupling the two driveshaft parts and, additionally, simplifies the centering operation.

In accordance with the invention, the means for coupling the two shaft parts includes a claw coupling with a first and a second coupling part. The centering journal has a round cross-section and is formed to match the free cross-section of the bore of the first profiled tube. The journal projects beyond the second profiled tube in the direction of the longitudinal axis. The first coupling part is attached to the end of the first profiled tube removed from the first universal joint by its first claws pointing away from the end. The second coupling part is rotationally fast with and, in the direction of the second universal joint, displaceably mounted along the longitudinal axis against a spring force and the second profiled tube. The second coupling part includes second claws which point to the first claws of the first coupling part.

An advantage of such an embodiment is that the two shaft parts are initially aligned relative to one another such that they are centered on the common longitudinal axis. Accordingly, when the parts are centered, the coupling operation for the transmission of torque takes place. When the centering journal is positioned in the bore of the first profiled tube and it extends far enough for the second coupling part to be displaced against the force of the spring, the two shaft parts, with their associated coupling parts can, by actuating the drive, be rotated relative to one another until the claws of the coupling parts have reached relative positions where engagement becomes possible. Accordingly, the respective claws are positioned opposite the associated gaps. In this condition, the second coupling part, up to the point of engagement, is displaced by the spring towards the first coupling part. Thus, the coupling operation is facilitated because the operation of inserting the centering journal with the round cross-section, for the purpose of aligning the two longitudinal axes of the shaft parts relative to one another, is simpler than in those cases where, additionally and simultaneously, circumferential centering has to take place.

To improve guidance of the second coupling part, the second coupling part is associated with a setting sleeve. The setting sleeve is designed to match the second profiled tube and is guided on the second profiled tube so as to be displaceable thereon and rotationally fast therewith. In this way, torque to be transmitted by the two coupling parts is introduced more advantageously by means of the setting sleeve into the second profiled tube. As in the case of universal joints, the torque varies in the course of one rotation. The varying torque is compensated for by the installed position of the driveshaft. Thus, it is necessary, in order to maintain this compensating effect, for the two shaft parts to be coupled to one another in a certain phase position. This is the reason why it is proposed that the claws of the two coupling parts only permit engagement in two positions turned around the longitudinal axis by 180°.

The setting sleeve is loaded by a spring. Accordingly, it is further proposed that the path of displacement, which can be covered by the setting sleeve together with the second coupling part away from the second universal joint, is delimited by a stop.

To keep the driveshaft as light as possible while at the same time observing the necessary distance between the centering journal and the second universal joint and respectively, the distance by which the centering journal projects beyond the end of the second profiled tube, the centering journal includes two elements. One of the elements is a solid journal portion which is inserted into a tube portion connected to the second universal joint or to the second profiled tube.

In a preferred embodiment, the two profiled tubes and the setting sleeve include tubes which have two formations extending diametrically outwardly from the longitudinal axis. The formations are in the form of ribs extending parallel to the longitudinal axis. Preferably, an assembly is provided where the two profiled tubes have identical dimensions. Here the setting sleeve is correspondingly larger so that it can be slid over the second profiled tube while being displaceable thereon. Also, transmission of torque is possible due to the inter-engaging formations. This embodiment is advantageous because the bore of the first profiled tube can be used directly to center the centering journal due to the circular shape of the bore region outside the formation. However, for the first profiled tube it is possible to select a cylindrical tube because the transmission of torque is effected by the first coupling part firmly connected to the first profiled tube. Designing the first profiled tube also as a double rib tube is advantageous. This design leads to an advantageous connection with the joint yoke of the first universal joint for torque transmitting purposes.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the driveshaft and its use in the mower of a corn picker is diagrammatically illustrated in the drawings wherein.

DETAILED DESCRIPTION OF THE DRAWINGS

Figure 1:
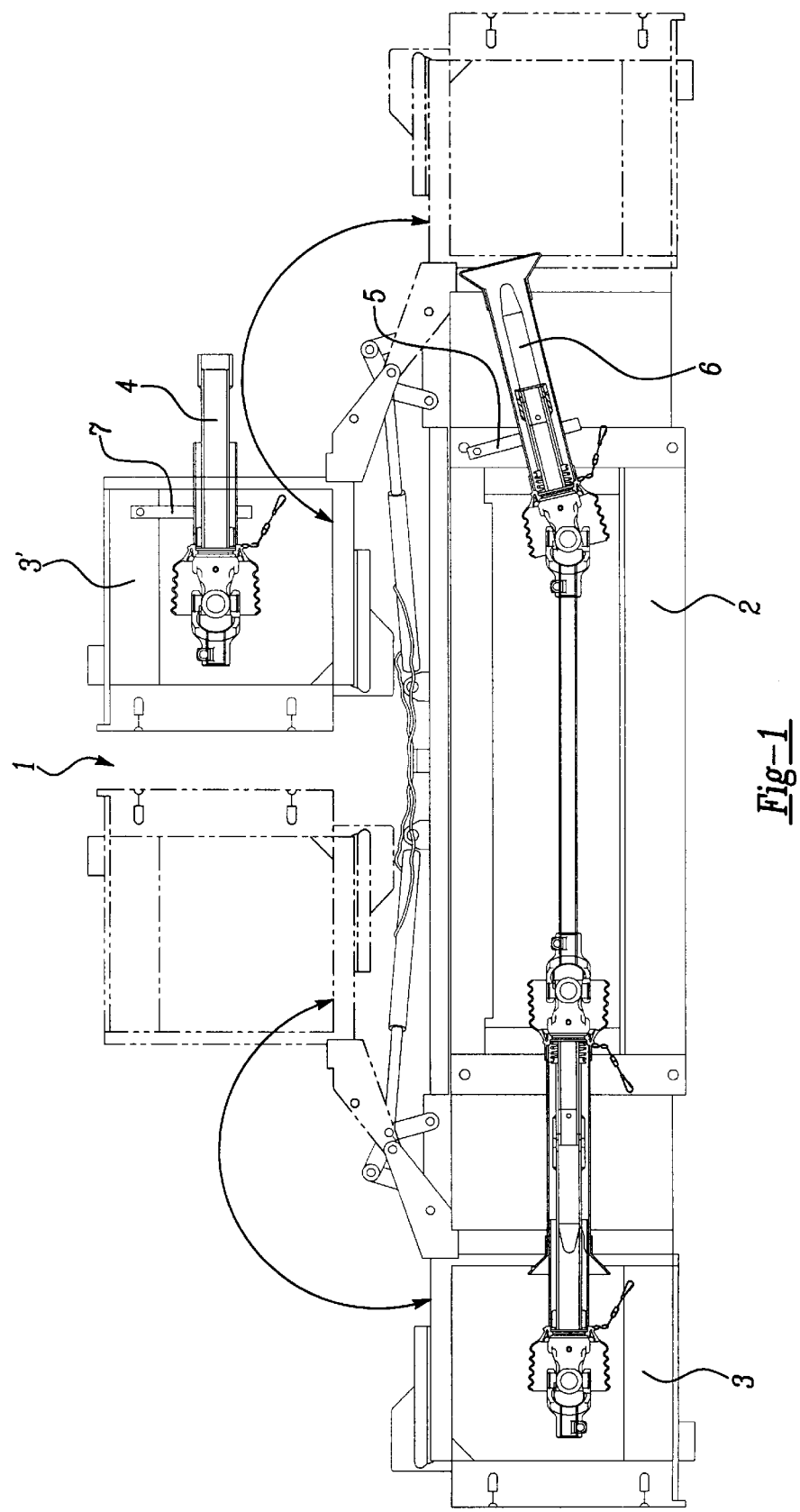
FIG. 1 is a schematic view of a corn picker and the two shaft parts of the driveshaft associated with one of the two side parts of the mower.

FIG. 1 is a diagrammatic view of the mower 1 of a corn picker, with the mower 1 including a central part 2 and two side parts 3, 3' which can be folded away. The side part 3 is shown in continuous lines in the operating position where it widens the central part 2. The dashed lines show the side part 3 in a folded away transport position. The second side part 3' shown in continuous lines is folded away in the transport position. The second side part 3' is shown together with the first shaft part 4.

FIG. 1 also shows the association of the second shaft part 6 connected to the drive from which the rotational movement is derived. Dashed lines show the end position of the second side part 3'. Both shaft parts 4, 6, in the separated position, are held by holding devices 5 and 7 in a predetermined position relative to the central part 2 and the side part 3'. If now the side part 3' is moved clockwise towards the central part 2, the first shaft part 4 approaches the second shaft part 6 in order to be connected to same. Thus, in the operating position, the side part 3' of the mower can also be driven. In the operating position, the position of the two shaft parts changes little relative to the holding devices 5, 7. The holding devices 5, 7 enable only slight movements of the driveshaft and can be designed in such a way that, if necessary, they release the two shaft portions 4, 6.

Below, the driveshaft with the two shaft parts 4, 6 will be described in greater detail with reference to FIGS. 2 to 7.

Figure 3:
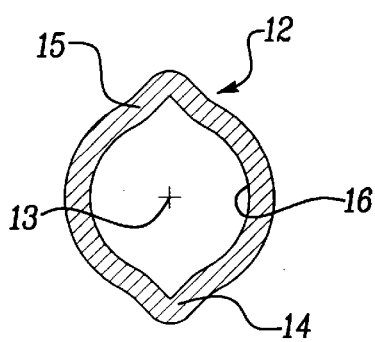
FIG. 3 is an enlarged cross-section view along sectional line III—III of FIG. 2.

The first shaft part 4 of the driveshaft includes a first universal joint 8. The universal joint 8, via connecting yoke 9, is connectable to an input journal for driving the side part 3 of the mower. The first shaft part 4 also includes a first joint yoke 11, with the first cross member 10 articulatably connecting the two parts to one another. The first joint yoke 11 is connected to the first profiled tube 12. The drawing shows the longitudinal axis 13 which is common to the first profiled tube 12 and the second shaft part 6. As can be seen in FIG. 3, the first profiled tube 12 is a so-called double rib tube which includes two ribs 14, 15 which extend parallel to the longitudinal axis 13 and are offset by 180°. FIG. 3 also illustrates that, across a circumferential portion, between the two ribs 14, 15, the bore 16 assumes a circular shape to define a circular bore.

Furthermore, the first shaft part 4 is associated with a first protective tube 17 which is coaxially attached around the first profiled tube 12. The tube 17 is supported by means of a connecting piece and a bearing ring on a corresponding projection of the first joint yoke 11. A first protective cone 18 is provided which is also supported by means of a connecting piece on the first joint yoke 11. The protective cone 18 at least partially covers the first universal joint 8 so that it is protected against any contact.

Figure 4:
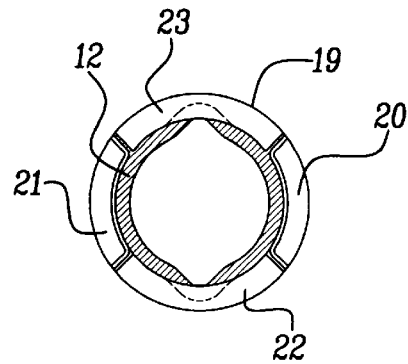
FIG. 4 is an enlarged cross-section view of the first coupling part as associated with the first profiled tube.
Figure 5:
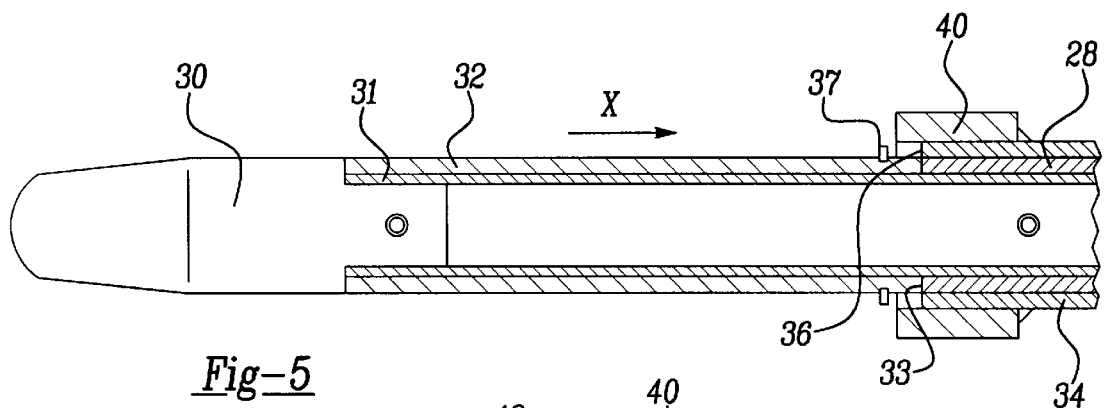
FIG. 5 is an enlarged cross-section view through a portion of the second shaft part with the centering journal.
Figure 6:
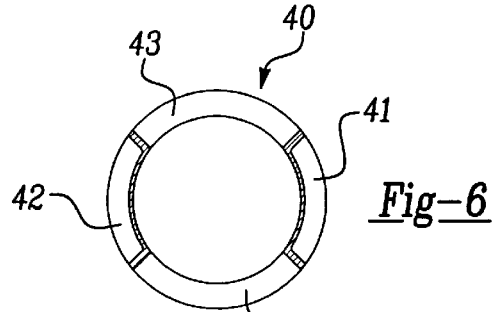
FIG. 6 is an enlarged cross-section view of the end face of the second coupling part, with the end face including claws, with the view extending in direction X.
Figure 7:
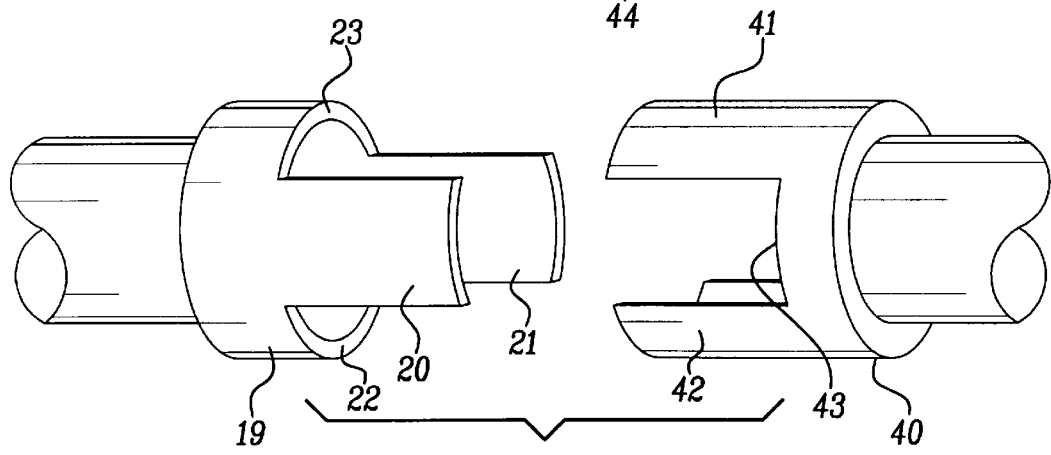
FIG. 7 is an enlarged exploded view of the first and second coupling parts.

The end of the first profiled tube 12, which end is removed from the first universal joint 8, is connected to the first coupling part 19. For this purpose, as can be seen in FIG. 4, the first profiled tube 12, over a predetermined length over which the first coupling part 19 is slid on to the first profiled tube, is turned cylindrically in this region. The ribs 14, 15 have been removed. The first coupling part 19 includes a corresponding bore by means of which it is slid on to said portion of the first profiled tube 12.

The first coupling part 19 is connected to the first profiled tube 12 by means of a weld, so that it is held immovably relative to the first profiled tube 12. At its free end face, the first coupling part 19 includes two diametrically arranged first claws 20, 21. Two first gaps 22, 23 are provided between the claws and are also circumferentially offset. The two claws 20, 21 differ from the gaps 22, 23 in respect of their circumferential extension, with the circumferential extension of the gaps 22, 23 being greater than that of the two claws 20, 21.

The second shaft part 6 includes a second universal joint 24 and a second connecting yoke 25. The yoke 25 is intended, for example, to be connected to a distributing drive for driving the side part 3 according to FIG. 1. The second universal joint 24 includes a second joint yoke 26. The second joint yoke 26 is articulatably connected to the second connecting yoke 25 by means of the second cross member 27. The second profiled tube 28 is connected to the second joint yoke 26. The second profiled tube 28 has smaller dimensions than the first profiled tube 12, as can be seen in FIG. 3. Also, the second tube 28 is very much shorter than the first profiled tube 12.

A centering journal 29 is inserted into the second profiled tube. The centering journal 29 includes a solid journal portion 30 which is tapered towards one end. An inserting end on the journal portion 30 is inserted into a tube portion 31. The tube portion 31 outer diameter corresponds to the outer diameter of the bore of the second profiled tube 28. The tube portion 31 is axially secured to the second profile tube 28 by means of a pin connection.

The outer diameter of the journal portion 30 is such that it matches that of the bore 16 of the first profiled tube 12. A spacing tube 32 is arranged coaxially around the tube portion 31 and has a diameter which corresponds to that of the journal portion 30 and thus to the bore 16 of the first profiled tube 12. The spacing tube 32 extends as far as the end face 33 of the second profiled tube 28. The length of the spacing tube 32 is such that the second claws 41, 42 of the second coupling part 40 are positioned in front of the end edge when they engage the first gaps 22, 23 of the first coupling part 19, as shown in FIG. 2.

Figure 2:
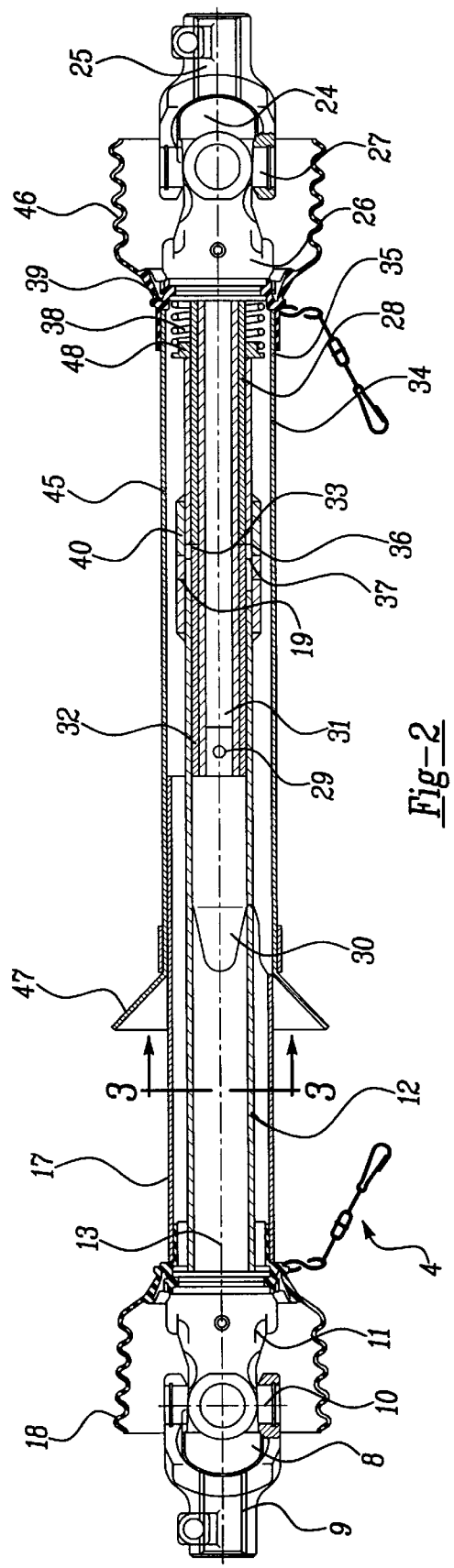
FIG. 2 a cross-section view of the driveshaft as an individual component, with the two shaft parts being in a coupled condition.

FIG. 2 also shows that the second coupling part 40 is fixed to the setting sleeve 34. The setting sleeve 34 is also provided in the form of a double rib tube and, with respect to dimensions, corresponds to the first profiled tube 12. The setting sleeve 34 also comprises a cylindrical face across which the two ribs have been removed so that the second coupling part 40, by means of a bore, is slid onto the cylindrical seat. The setting sleeve 34 is connected with the coupling part 40 by means of a weld at its end face facing the second universal joint 24. The setting sleeve covers a considerable length of the second profiled tube 28. A supporting disc 48 rests against the first end face 35 of the setting sleeve 34. The support disc 48 is loaded by a compression spring 38. The other end of the compression spring 38 is supported against the contact face 39 of the second joint yoke 26. The compression spring 38 loads the setting sleeve 34 to displace it away from the second universal joint 24 towards the first coupling part 19. Thus, the second claws 41, 42 are held in engagement with the first gaps 22, 23, and the first claws 20, 21 are held in engagement with the second gaps 43, 44. This engagement enables torque to be transmitted from the second profiled tube 28, via the setting sleeve 34 and the second coupling part 40, to the first coupling part 19 and, in turn, to the first profiled tube 12. In FIG. 2, the coupling parts 19, 40 are shown in the engaged condition to permit the transmission of torque.

It can be seen that the second end face 36 of the setting sleeve 34 is arranged at an axial distance from the stop 37. The compression spring 38 pushes the setting sleeve 34 with pretension against the stop 37 in the uncoupled condition. The stop 37 is shown in the form of a securing ring which engages a groove of the spacing tube 32. The stop 37 delimits the movement of the second coupling part 40 and of the setting sleeve 34 on the second profiled tube 28 away from the second universal joint 24 when the two coupling parts 19, 40 are disengaged. The second shaft part 6 includes a second protective tube 45 which is connected to a second protective cone 46. Both, together, are supported on the second joint yoke 26. The second protective tube coaxially surrounds the second profiled tube 28 as well as the centering journal 29. The protective tube 45, at its other end, includes a centering cone 47 for pre-centering the two shaft parts 4, 6 relative to one another.

For the purpose of coupling the two shaft parts 4, 6 to one another, starting from the positions as shown in FIG. 1, the first shaft part 4 first approaches the second shaft part 6 until the end of the first shaft part 4, which is represented by the first coupling part 19, approaches the centering cone 47 and is radially aligned by it. The conical part of the journal portion 30 of the centering journal 29 continues the centering procedure after first passing into the bore of the first coupling part and after entering the bore 16 of the first profiled tube 12. Subsequently, the two universal joints 8, 24 approach one another. The centering journal 29 enters more deeply into the first profiled tube 12 and, at the same time, the two coupling parts 19, 40 move towards one another. The first coupling part 19, by means of its first claws 20, 21 abuts, for example, the second claws 41, 42 of the second coupling part. While the two shaft parts 4, 6 continue to move into one another, the second coupling part 40, together with the setting sleeve 34, experiences on the second profiled tube 28, a displacement against the force of the spring 38 towards the second universal joint 24. If now the rotary drive is started so that, for example, the second shaft part 6 rotates, a relative movement of the two coupling parts 19, 40 occurs around the longitudinal axis 13 until the first claws 20, 21 reach positions which correspond with the second gaps 43, 44 and the second claws 41, 42 reach positions which correspond to the first gaps 22, 23 (See FIG. 7). When these positions are reached, the second coupling part 40, with the setting sleeve 34, is displaced as a result of the spring 38, on the second profiled tube 28 away from the second universal joint 24 until the coupling parts 19, 40 are in the engaged position.

While the above detailed description describes the preferred embodiment of the present invention, the invention is susceptible to modification, variation and alteration without deviating from the scope and fair meaning of the subjoined claims.

I claim:

1. A driveshaft used to drive, or in the drives of agricultural machinery, comprising:

a first shaft part with a first universal joint and a first profiled tube connected to said first universal joint;

a second shaft part with a second universal joint and a second profiled tube connected to said second universal joint, said first and second profiled tubes having a cross-section deviating from a circular cross-section;

coupling means for coupling the first and the second shaft parts, said coupling means including centering guiding means associated with the first profiled tube, and a centering journal associated with the second profiled tube, said coupling means serving to align the first and the second shaft part and the first and the second shaft part in the coupled condition defining a joint longitudinal axis;

said coupling means for coupling the first and the second shaft part including a claw coupling, said claw coupling having a first and a second coupling part, said centering journal has a round cross-section and is formed to match the free cross-section of a bore of the first profiled tube, the centering journal projects beyond the second profiled tube in the direction of the longitudinal axis, the first coupling part is attached to the end of the first profiled tube removed from the first universal joint, the first coupling part having said first claws pointing away from said end of said first profiled tube and the second coupling part is rotationally fast with and, in the direction of the second universal joint, displaceably mounted along the longitudinal axis against a spring force along the second profiled tube, and said second coupling part having second claws pointing to the first claws of the first coupling part.

2. A driveshaft according to claim 1, wherein the second coupling part is guided on the second profiled tube by a setting sleeve designed to match the second profiled tube so as to be displaceable and rotationally fast.

3. A driveshaft according to claim 2, wherein the two profiled tubes and the setting sleeve are formed of tubes which include two formations which extend diametrically outwardly from the longitudinal axis and are provided in the form of ribs extending parallel to the longitudinal axis.

4. A driveshaft according to claim 1, wherein the claws of the two coupling parts only permit engagement in two positions turned around the longitudinal axis by 180°.

5. A driveshaft according to claim 1, wherein the displacement of the second coupling part away from the second universal joint is delimited by a stop.

6. A driveshaft according to claim 1, wherein the centering journal has a conically extending solid journal portion and a tube portion which receives said solid journal portion and is connected to one of the second universal joint and to the second profiled tube.

* * * * *